(12) United States Patent
Orsini et al.

(10) Patent No.: US 10,775,145 B2
(45) Date of Patent: Sep. 15, 2020

(54) ERGONOMIC TAPE MEASURE

(71) Applicant: Stanley Black & Decker, Inc., New Britain, CT (US)

(72) Inventors: Antony Orsini, Oradell, NJ (US); Vincent Cook, Milford, CT (US)

(73) Assignee: Stanley Black & Decker, Inc., New Britain, CT (US)

( * ) Notice: Subject to any disclaimer, the term of this patent is extended or adjusted under 35 U.S.C. 154(b) by 109 days.

(21) Appl. No.: 15/944,218

(22) Filed: Apr. 3, 2018

(65) Prior Publication Data

US 2018/0292193 A1 Oct. 11, 2018
US 2019/0226823 A9 Jul. 25, 2019

Related U.S. Application Data

(63) Continuation-in-part of application No. 29/596,445, filed on Mar. 8, 2017, now abandoned.

(60) Provisional application No. 62/483,214, filed on Apr. 7, 2017.

(51) Int. Cl.
*G01B 3/1041* (2020.01)
*G01B 3/1046* (2020.01)
*G01B 3/1048* (2020.01)

(52) U.S. Cl.
CPC .......... *G01B 3/1041* (2013.01); *G01B 3/1046* (2020.01); *G01B 3/1048* (2020.01)

(58) Field of Classification Search
CPC ............ G01B 2003/103; G01B 3/1005; G01B 3/1041; G01B 2003/1038; G01B 2003/1048; G01B 2003/1015

USPC ........................................................ 33/769
See application file for complete search history.

(56) References Cited

U.S. PATENT DOCUMENTS

| | | | |
|---|---|---|---|
| 1,658,667 A | * | 2/1928 | Buttigieg ............. G01B 3/1041 33/769 |
| D328,312 S | | 7/1992 | Halm |
| D328,471 S | | 8/1992 | Halm |
| D329,463 S | | 9/1992 | Halm |
| D347,395 S | | 5/1994 | Yang |
| D348,691 S | | 7/1994 | Bell et al. |
| D375,269 S | | 11/1996 | Wertheim et al. |

(Continued)

FOREIGN PATENT DOCUMENTS

| CA | 2308240 A1 | 11/2000 |
|---|---|---|
| EP | 0724133 A2 | 7/1996 |

(Continued)

OTHER PUBLICATIONS

Clint Deboer, Hart Tape Measure with Magnetic Tang, Pro Tool Review, Dec. 17, 2014, Internet.

(Continued)

*Primary Examiner* — Yaritza Guadalupe-McCall
(74) *Attorney, Agent, or Firm* — Wright IP & International Law; Eric G. Wright

(57) ABSTRACT

An ergonomic tape measure having a side which has a protruding surface that fills at least a part of the gripping cavity of an operator's hand and provides a comfortable and secure feeling grip when holding the tape measure. The tape measure can have a grip swell surface which fills part or all of the gripping cavity of an operator's hand. The tape measure can have a grip swell side center region which protrudes from a grip swell plane and into the gripping cavity of an operator's hand.

20 Claims, 19 Drawing Sheets

(56) References Cited

U.S. PATENT DOCUMENTS

| | | |
|---|---|---|
| D399,149 S | 10/1998 | Bennett |
| D400,585 S | 11/1998 | Fritz et al. |
| D419,081 S | 1/2000 | Evans et al. |
| D421,231 S | 2/2000 | Hsu |
| D441,309 S | 5/2001 | Evans, Jr. et al. |
| 6,226,886 B1 * | 5/2001 | Lamond .............. G01B 1/00 33/769 |
| D451,832 S | 12/2001 | Lamond et al. |
| D464,579 S | 10/2002 | Martone |
| D466,036 S | 11/2002 | Odachowski |
| D471,118 S | 3/2003 | Evans, Jr. |
| D471,827 S | 3/2003 | Ranieri et al. |
| D474,412 S | 5/2003 | Ichinose et al. |
| D487,025 S | 2/2004 | Grunstad et al. |
| D491,082 S | 6/2004 | Hsu |
| 6,857,198 B1 * | 2/2005 | Lin .............. G01B 3/1041 33/761 |
| D504,628 S | 5/2005 | Weeks et al. |
| D507,195 S | 7/2005 | Kondo et al. |
| D507,197 S | 7/2005 | Sun |
| D522,890 S | 6/2006 | Huang |
| D522,891 S | 6/2006 | Huang |
| D528,026 S | 9/2006 | Liao |
| D533,796 S | 12/2006 | Radivojevic et al. |
| D534,091 S | 12/2006 | Ebihara |
| D555,020 S | 11/2007 | Hesch |
| D560,522 S | 1/2008 | Farnworth et al. |
| D568,188 S | 5/2008 | Chen |
| D579,359 S | 10/2008 | Critelli et al. |
| D582,810 S | 12/2008 | Cook |
| D590,283 S | 4/2009 | Critelli et al. |
| D590,284 S | 4/2009 | Critelli et al. |
| D597,426 S | 8/2009 | Huang |
| D611,849 S | 3/2010 | Cook et al. |
| D613,629 S | 4/2010 | Suzuki |
| D616,941 S | 6/2010 | Bradfield |
| D638,726 S | 5/2011 | Hagstrom et al. |
| D638,727 S | 5/2011 | Hagstrom et al. |
| D653,970 S | 2/2012 | Robinson et al. |
| D653,971 S | 2/2012 | Robinson et al. |
| D653,973 S | 2/2012 | Robinson et al. |
| D653,977 S | 2/2012 | Robinson et al. |
| D667,743 S | 9/2012 | Huang |
| D670,182 S | 11/2012 | Carl |
| D680,888 S | 4/2013 | Ranieri |
| D686,514 S | 7/2013 | Robinson et al. |
| D686,515 S | 7/2013 | Robinson et al. |
| D700,530 S | 3/2014 | Carl |
| D703,073 S | 4/2014 | Carl |
| D717,674 S | 11/2014 | Vu et al. |
| D726,043 S | 4/2015 | Cook et al. |
| D729,081 S | 5/2015 | Nelson |
| D729,082 S | 5/2015 | Nelson |
| D733,597 S | 7/2015 | Hyma et al. |
| D736,107 S | 8/2015 | Lee |
| D757,587 S | 5/2016 | Li |
| D783,430 S | 4/2017 | Wortelboer et al. |
| D788,611 S | 6/2017 | Anderson |
| D798,491 S | 9/2017 | Kelly et al. |
| D803,711 S | 11/2017 | Jost et al. |
| D806,711 S | 1/2018 | Sakaguchi et al. |
| 2002/0029489 A1 | 3/2002 | Murray |
| 2002/0073569 A1 | 6/2002 | Simmons |
| 2011/0099828 A1 * | 5/2011 | Hernandez .......... G01B 3/1005 33/757 |
| 2011/0179661 A1 | 7/2011 | Delneo et al. |
| 2011/0179664 A1 | 7/2011 | Delneo et al. |
| 2018/0292193 A1 * | 10/2018 | Orsini .............. G01B 3/1041 |

FOREIGN PATENT DOCUMENTS

| | | |
|---|---|---|
| EP | 1050737 A2 | 11/2000 |
| JP | 2001201301 A | 7/2001 |

OTHER PUBLICATIONS

Hart, Enlarged photo of tape measure, HTM 25, as early as Dec. 17, 2014.

Extended European Search Report, EP Application No. 18165739.6-1022, EPO (dated May 9, 2018).

* cited by examiner

ERGONOMIC TAPE MEASURE

CROSS-REFERENCE TO RELATED APPLICATIONS

This patent application claims benefit under 35 U.S.C. § 120 to copending US design application number 29/596,445 titled "Ergonomic Tape Measure" filed Mar. 8, 2017. This patent application is also a non-provisional application of and claims the benefit of the filing date of copending US provisional patent application number 62/483,214 titled "Ergonomic Tape Measure" filed Apr. 7, 2017.

FIELD

This disclosure regards an ergonomic tape measure.

INCORPORATION BY REFERENCE

This patent application incorporates by reference in its entirety copending design application number 29/596,445 titled "Ergonomic Tape Measure" filed Mar. 8, 2017. This patent application also incorporates by reference in its entirety copending US provisional patent application number 62/483,214 titled "Ergonomic Tape Measure" filed Apr. 7, 2017.

BACKGROUND

Tape measure designs that are difficult to hold, or are uncomfortable to use, can distract a user from taking an accurate measure and cause rework. Tape measures that fit poorly in a human hand can cause frequent concern as to whether the operator has a satisfactory grip on the tape measure, or whether they will drop it. Tape measures can be used in many difficult work environments and situations where the use of a tape measure is quite difficult. There is a strong need to develop an ergonomic tape measure.

SUMMARY

In an embodiment, the tape measure disclosed herein can have a side which has a protruding surface that fills at least a part of the gripping cavity of a hand of an operator and provides a comfortable and secure feeling grip when holding the tape measure. The tape measure is ergonomic in design and can be used by an operator, without physical stress to the hand and/or arm and under a wide variety of circumstances with ease and reliability. The tape measure can have a grip swell surface which fills part, or all, of the gripping cavity of an operator's hand. The tape measure can have a grip swell side center region which protrudes from a grip swell plane and into the gripping cavity of an operator's hand.

In an embodiment, the tape measure can have a housing at least in part covering a tape that is selectively extendable from and retractable to a hook side of the housing. The housing can have a grip swell side which has a grip swell surface; and the grip swell surface can have a grip swell peak which is part of a curved surface which is convex and which projects at least in part to fill at least a portion of the gripping cavity of an operator. The grip swell surface can have one or more of a variety of shapes. For example, the grip swell surface can at least in part have a convex surface. In another example, the grip swell surface can have at least in part a surface of revolution. In yet another embodiment, the grip swell surface can have the shape of a dome, or a generally domed shape. Optionally, the grip swell surface can have a plurality of facets.

In an embodiment, the tape measure can have a grip swell surface which is configured at least in part as a surface of revolution of a curve and/or at least in part as a surface of revolution of a spline.

In an embodiment, the tape measure can have a housing at least in part covering a tape selectively extendable from and retractable to a hook side of the housing. The housing can have a grip swell side which has a grip swell volume configured to fill at least a portion of a gripping cavity of a human hand. The grip swell volume can have at least a portion of which encompasses at least a portion of a grip swell side center region which has a curved surface which is convex and which projects at least in part to fill at least a portion of the gripping cavity of an operator. The grip swell volume can be configured proximate to a grip swell peak. In an embodiment, at least a portion of the grip swell volume can be configured proximate to a grip swell peak. For example, the grip swell volume can have a grip swell peak which is configured at a distance of 0.3 cm or greater from a grip swell plane. In another embodiment, the grip swell volume can have a grip swell peak which is configured at a distance of 0.7 cm or greater from a transition plane. In yet another embodiment, the grip swell volume can be in a range of 1.60 cm^3 to 146.14 cm^3. Optionally, the grip swell volume can be a dome volume in a range of 1.60 cm^3 to 146.14 cm^3.

In an embodiment, the tape measure can have a housing at least in part covering a tape selectively extendable from and retractable to a hook side of the housing. The tape measure can have a grip swell with a grip swell side center region. The grip swell side center region can have at least a portion which protrudes from a grip swell plane and projects at least in part to fill at least a portion of the gripping cavity of an operator.

In an embodiment, at least a portion of the grip swell which protrudes from a grip swell plane can have a portion which is convex. In another embodiment, at least a portion of the grip swell which protrudes from a grip swell plane can have a portion which is a dome surface. In yet another embodiment, at least a portion of the grip swell which protrudes from a grip swell plane can have a grip swell peak and/or a dome peak.

In an embodiment, the tape measure can have at least a portion which protrudes from a grip swell plane which is configured to fill at least in part the gripping cavity of an operator's hand.

BRIEF DESCRIPTION OF THE DRAWINGS

The present technology in its several aspects and embodiments solves the problems discussed above and significantly advances the technology of tape measures. The present technology can become more fully understood from the detailed description and the accompanying drawings, wherein.

Herein, like reference numbers in one figure refer to like reference numbers in another figure.

DETAILED DESCRIPTION

This disclosure relates to the many and varied embodiments of tape measures which are ergonomically shaped for gripping by an operator. In an embodiment, a tape measure 10 can be gripped by a hand 5000 (FIG. 6) of an operator. The tape measure can have a grip swell volume 1699 which has a form which ergonomically fits against and/or adjacent to the middle palm 5050 of the hand 5000 while a number of a user's fingers 5003 at least in part grip a bottom side 41 and a thumb 5100 of the user can comfortably grip at least a portion of a hook side 71.

Figure 1:
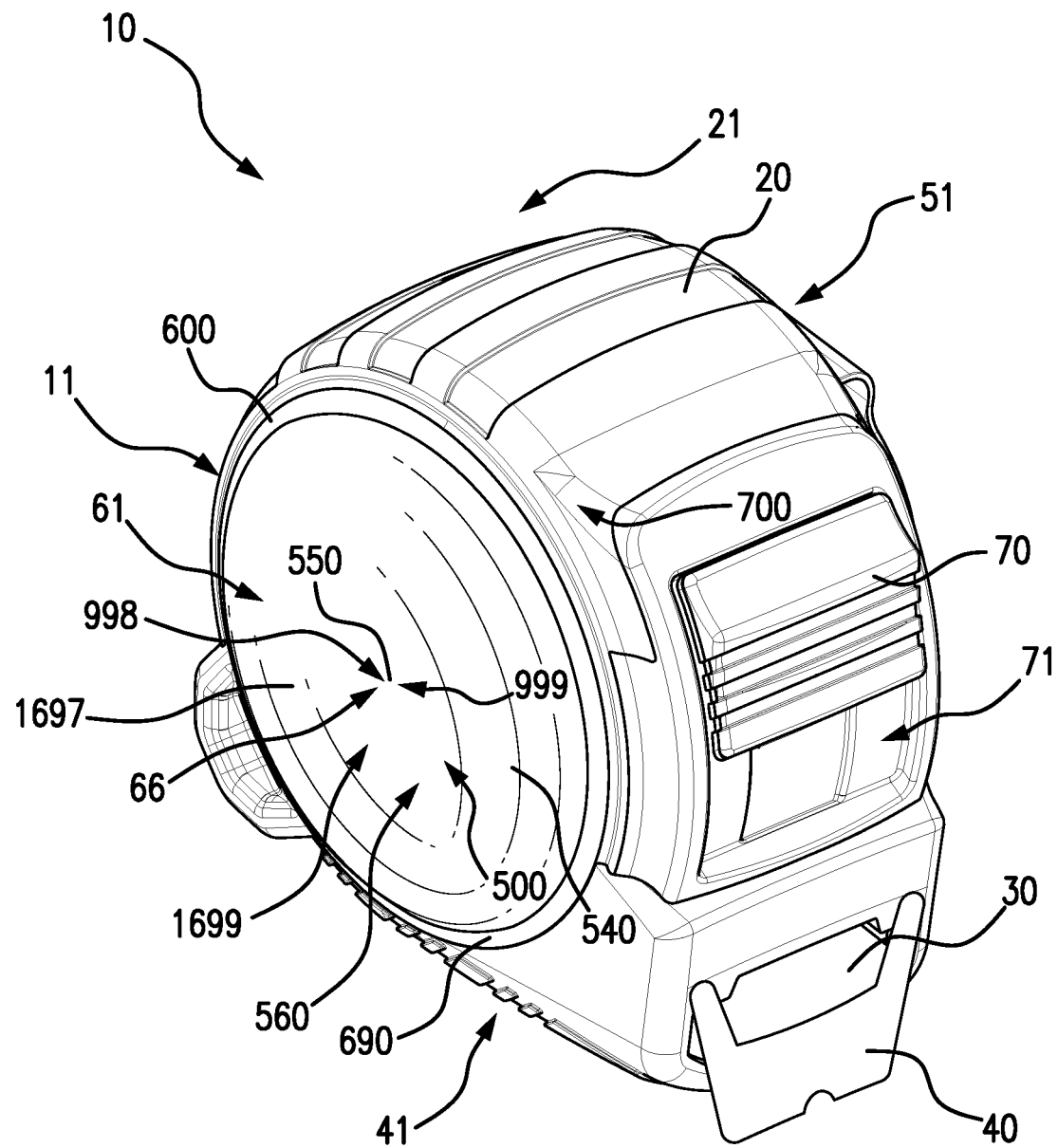
FIG. 1 is perspective view of a tape measure.

FIG. 1 is perspective view of the tape measure 10.

FIG. 1 shows a tape measure 10 which is an ergonomic tape measure having a housing 20, a tape 30 and a tape hook 40. The tape measure has a grip swell side 61, a clip side 51, a top side 21, a back side 11, the bottom side 41 and a hook side 71 from which the tape hook 40 extends.

FIG. 1 shows the tape measure 10 which has the housing 20, and a slide lock 70 In the embodiment of FIG. 1, the tape measure 10 is shown to have a grip swell 999 having a grip swell volume 1699 which is formed by a dome volume 560 of a dome 500 having a dome surface 540 and a dome peak 550, as well as a dome base ring volume 690 which is bounded by a dome base ring 600. FIG. 1 also shows a transition 700 of grip swell side 61.

Figure 5:
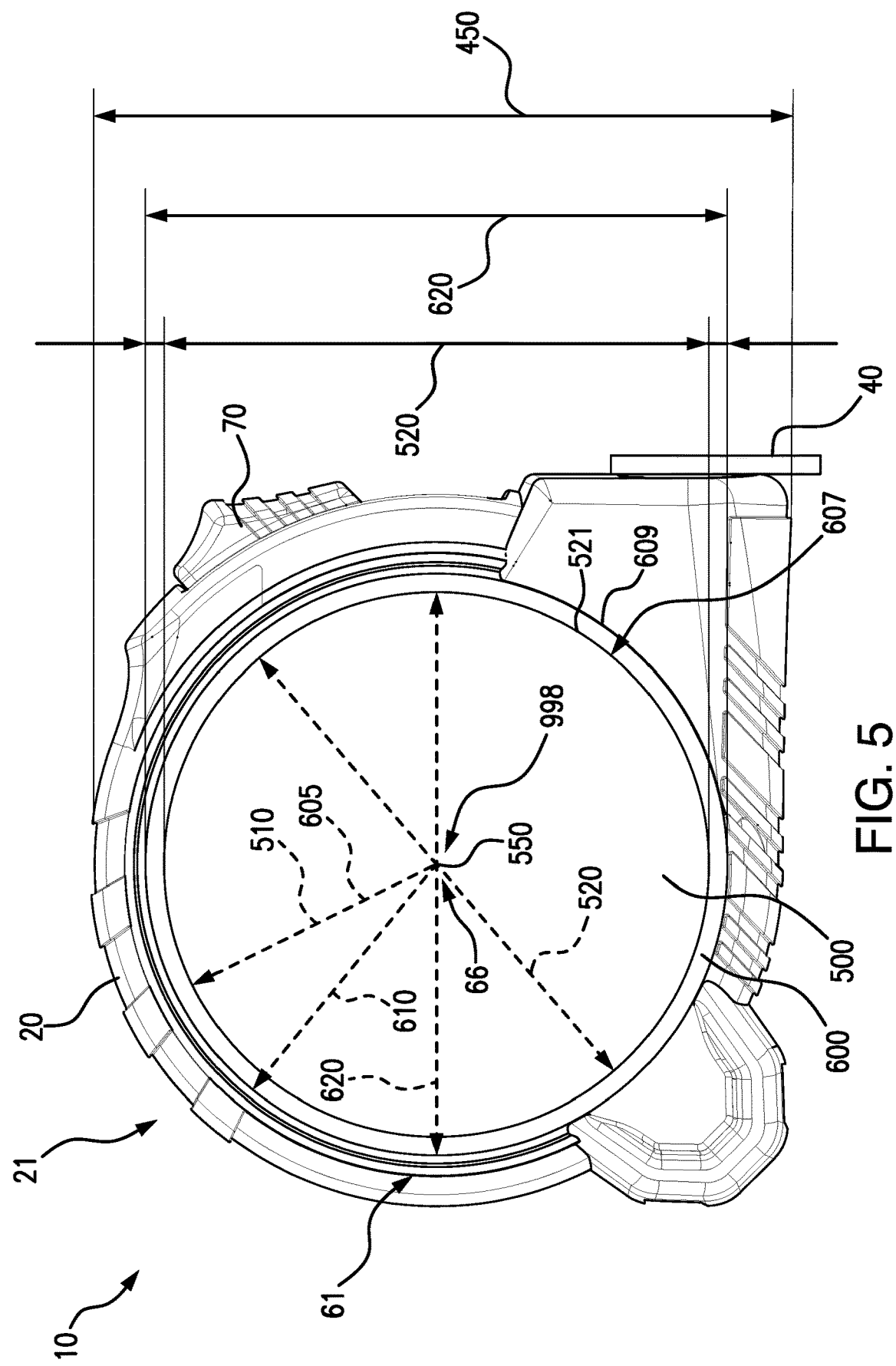
FIG. 5 is a grip swell side view of the tape measure.

In an embodiment the grip swell side 61 can have a grip swell side center region 66 which is a region which can include the grip swell peak 998, or also for example the dome peak 550, and can extend radially or otherwise away from the Z axis across a portion of the grip swell surface 1697 out to the distance of the dome base ring outer radius 610 (FIG. 5).

Figure 2:
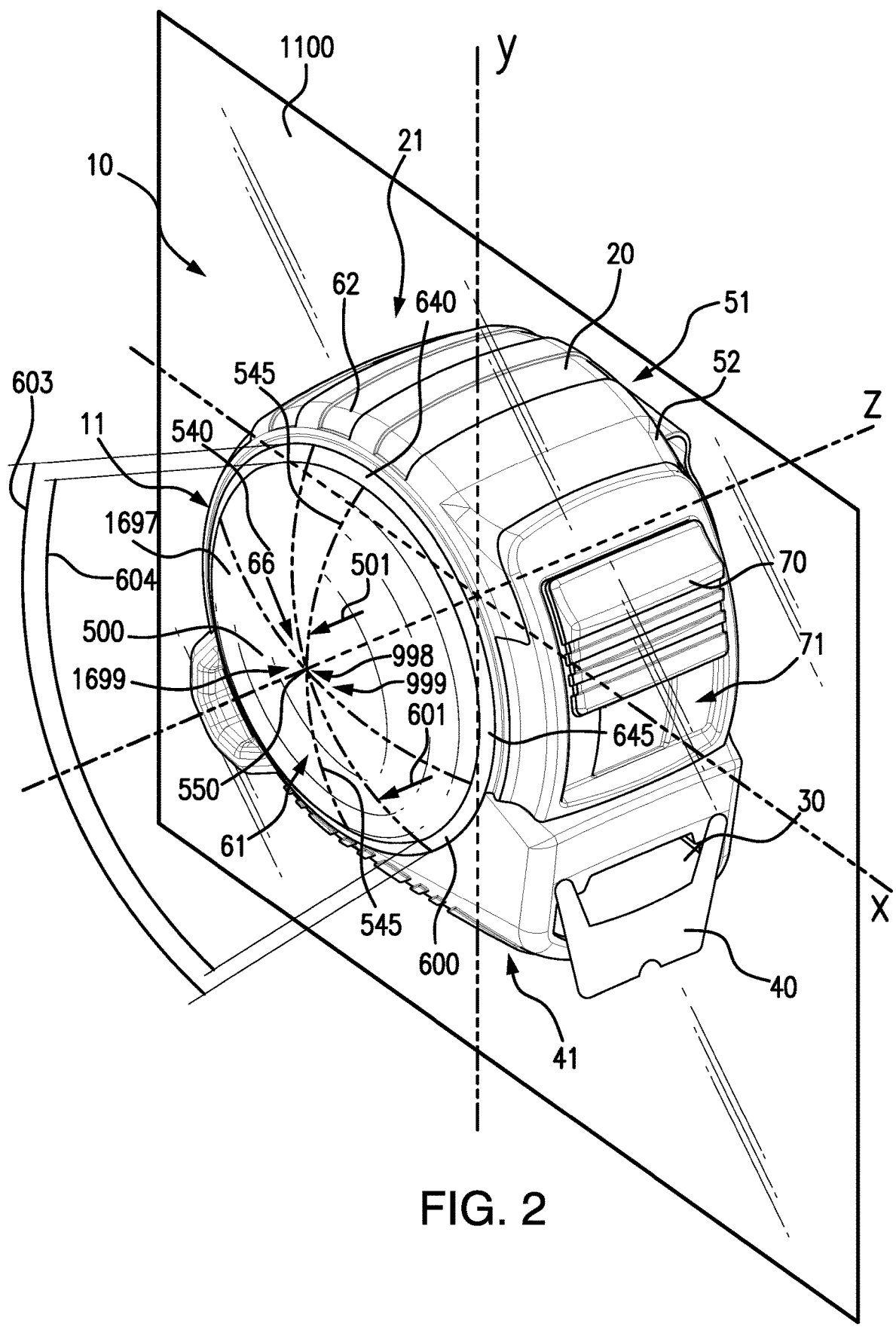
FIG. 2 is a perspective view of the tape measure showing geometric axis.

FIG. 2 is a perspective view of the tape measure showing geometric axis.

FIG. 2 shows the tape measure configured about an X,Y,Z coordinate plane. The X axis is shown to extend from the back side 11 through the hook side 71 and is coplanar with a bisecting plane along the Y axis, e.g. a center plane 1100, which bisects the housing from the top side 21 to the bottom side 41. The Y axis is shown to extend from the top side 21 through the bottom side 41.

The Z axis is shown passing through the dome peak 550 on the grip swell side 61 and through the clip side 51.

Optionally the configuration having a dome 500 and a dome base ring 600 to achieve the grip swell volume 1699 can be replaced with a unibody or one-piece construction. Optionally, any number of shapes, pieces, parts and surfaces can be used to achieve a grip swell volume 1699.

The grip swell volume 1699 can be the volume under of a grip swell surface 1697 which can be formed from one or more surfaces which can be used together to for a grip swell surface 1697.

Figure 9:
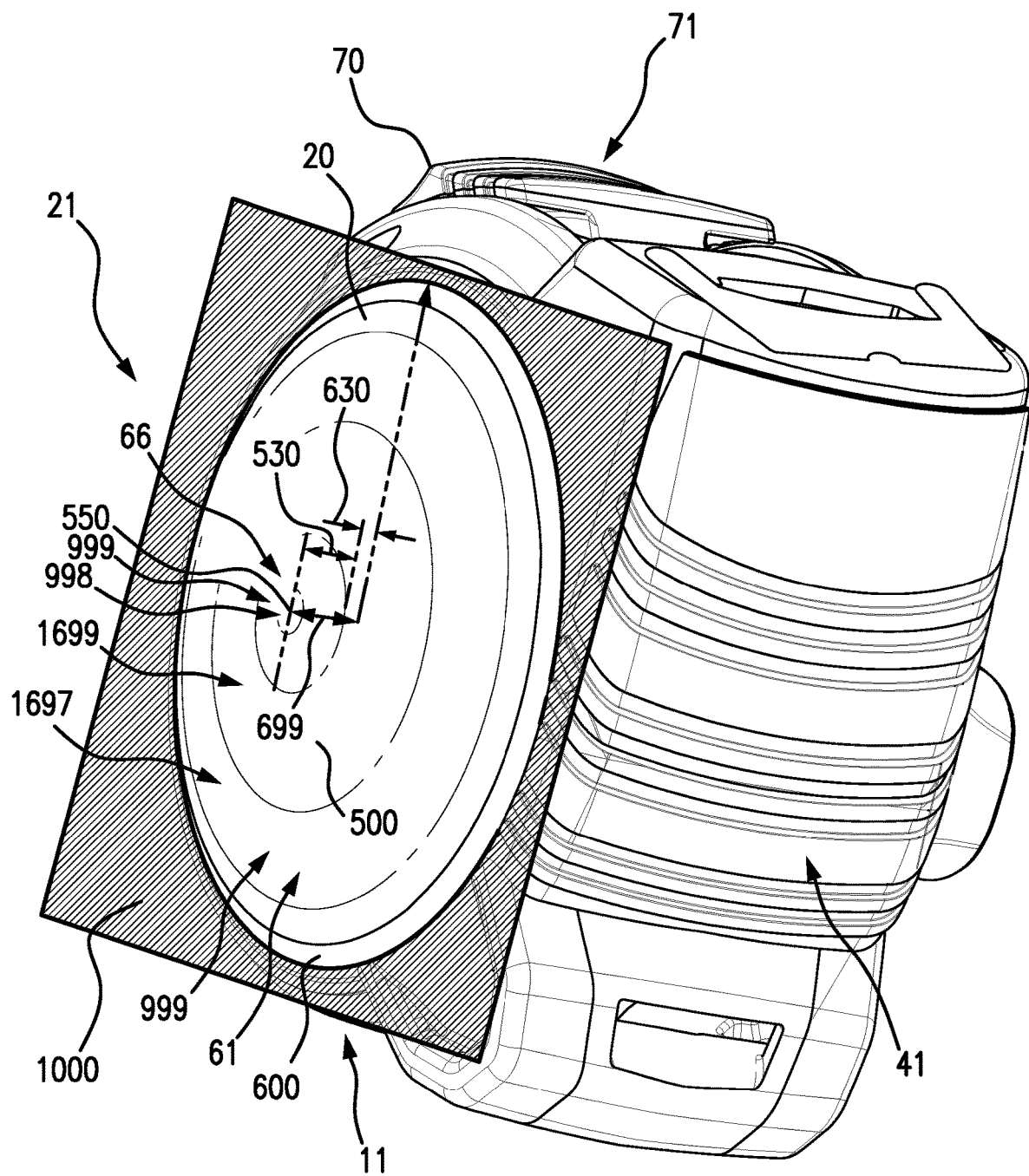
FIG. 9 shows a perspective view of the grip swell plane.

In an embodiment, the grip swell surface 1697 can have a geometry or shape which is a spherical cap, spherical dome, spherical segment of one base, a portion of a sphere cut by one plane (see also FIG. 9 showing a grip swell plane 1000), a hemisphere, a portion of a hemisphere, a curve, a convex curve, a revolved surface, a spherical surface, a spline surface, a faceted surface, or another shape, each of which are formed to project from the grip swell plane 1000 and/or the transition plane 2000 (FIG. 10) and which can fill at least a portion of, or all of, a gripping cavity of a hand of an operator.

In an embodiment, the grip swell surface 1697 can have a single peak shape, instead of a multi peak shape, or another shape. In an embodiment, the grip swell surface 1697 can have a geometry or shape extending from global minima to a global maximum without other local maxima or minima therebetween. The grip swell surface 1697 can be a spherical cap Revolved Surface Embodiment In an embodiment, the Z axis can be an axis of revolution for a dome curve 545. In an embodiment the dome curve 545 can be is revolved to form the dome surface 540.

In an embodiment, the Z axis can be an axis of revolution for a dome base ring curve 645. In an embodiment the dome base ring curve 645 can be revolved to form the dome base ring surface 640.

Spherical Surface Embodiment

In an embodiment, one or both of the dome surface 540 and the dome base ring surface 640 can be formed as a surface and or section of a sphere. The dome surface 540 can be formed as a surface section of a dome sphere. The dome base ring surface 640 can be formed as a surface section of a dome base ring sphere. As used herein, the term "sphere" should be broadly construed and can be understood in addition to its ordinary and customary meaning to also encompass a geometric sphere or an approximation thereof, such as a spheroid, in various embodiments.

FIG. 2 shows an optional embodiment in which the dome surface 540 can be formed as a surface portion of the dome sphere having a dome sphere radius 501. The dome surface 540 can have a dome arc 1500 (FIG. 12) in a range of 10° to 66°, or 5° to 175°, such as 15°, 22°, 30°, 45°, of 45° or 120°.

FIG. 2 shows an optional embodiment in which the dome base ring surface 640 can be formed as a surface portion of the dome base ring sphere having a dome base ring sphere radius 601. The dome base ring surface 640 can have a dome base ring outer arc 603 of 30° to 70°, such as 55°, or 66° and a dome base ring inner arc 604 can have a value of 30° to 66°, such as 35°, 43°, 53°.

Optionally, the dome sphere radius 501 and the dome base ring sphere radius 601 can be the same or different.

Optionally, the grip swell surface 1697 can have as many, or as few, rings, curves, segments as desired, or can be only one spline or curve.

FIG. 2 also shows the center plane 1100 which bisects the housing 20 between the grip swell side edge 62 and the clip side edge 52.

Spline Surface Embodiment

In an embodiment the Z axis can be an axis of revolution for a dome spline. In an embodiment the dome spline which is revolved to form the dome surface 540.

In an embodiment the Z axis can be an axis of revolution for a dome base ring spline. In an embodiment the dome base ring curve 645 which is revolved to form the dome base ring spline.

In an embodiment the dome spline and dome base ring spline can be replaced by a single grip swell surface spline.

Faceted Surface Embodiment

In an embodiment, the dome 500 can be faceted. For example, the dome 500 can have facets in a range of from 2 facets to hundreds of facets, such as 3 facets or more, based respectively on three arcs, or more. The facets can be designed to generally conform to a desired curve, spline or other shape. In another embodiment, the curve which is to be revolved to create a surface of revolution can be faceted and can have facets in a range of from 2 facets to hundreds of facets, such as 3 facets, 10 facets or more facets.

Alternate Shape(s) Embodiment

Alternate methods can be used to produce the grip swell surface 1697. For nonlimiting example, a molded surface can be used with is configured and/or contoured to the shape of the human hand and/or one or more hand parts which are used in gripping the tape measure.

Figure 3:
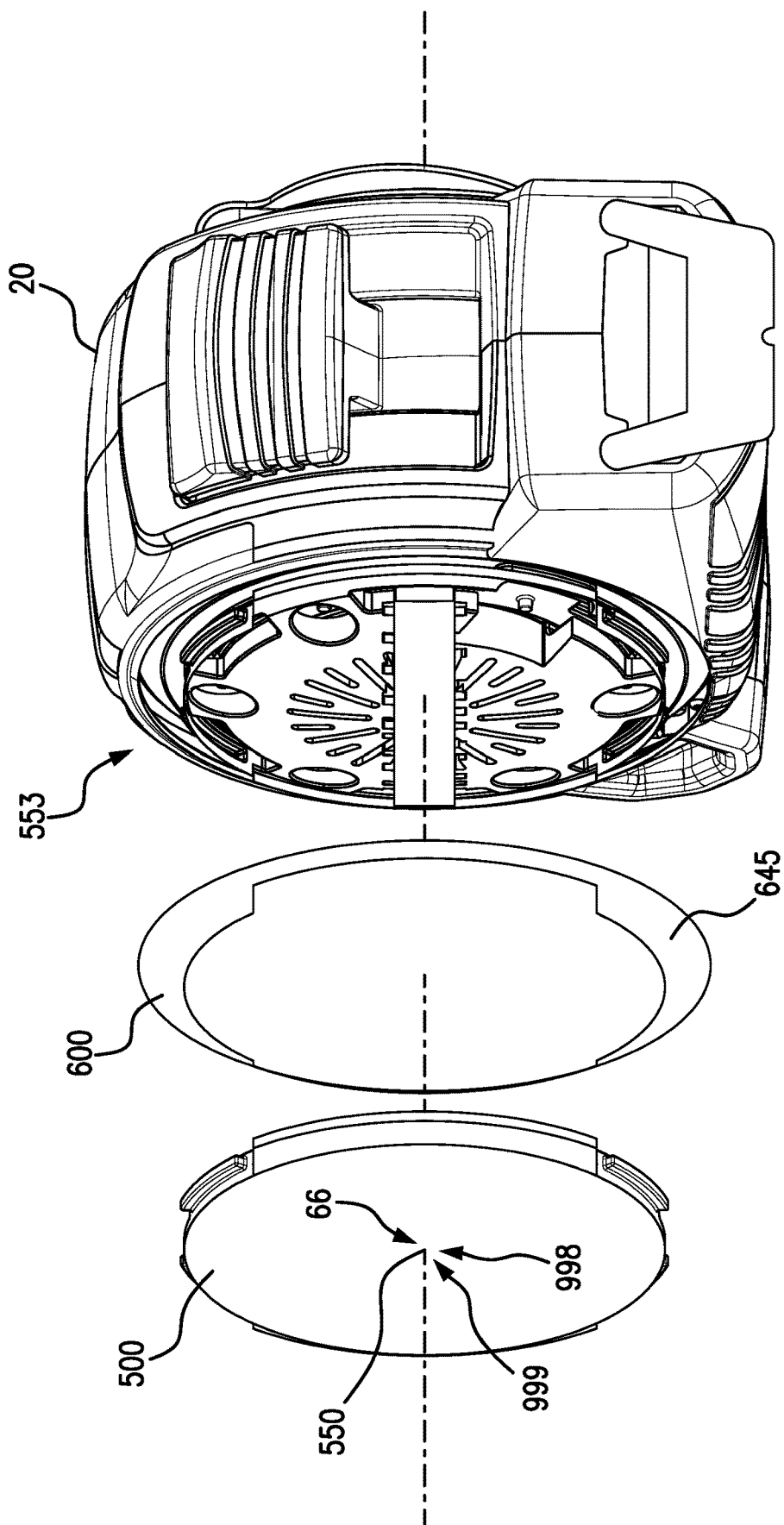
FIG. 3 is an exploded perspective view showing the dome and dome base ring separated from a dome base ring interface of the housing.

FIG. 3 is an exploded view showing the dome 500 and dome base ring 600 separated from the main portion of the housing 20, as well as the dome base ring interface 553.

Figure 4:
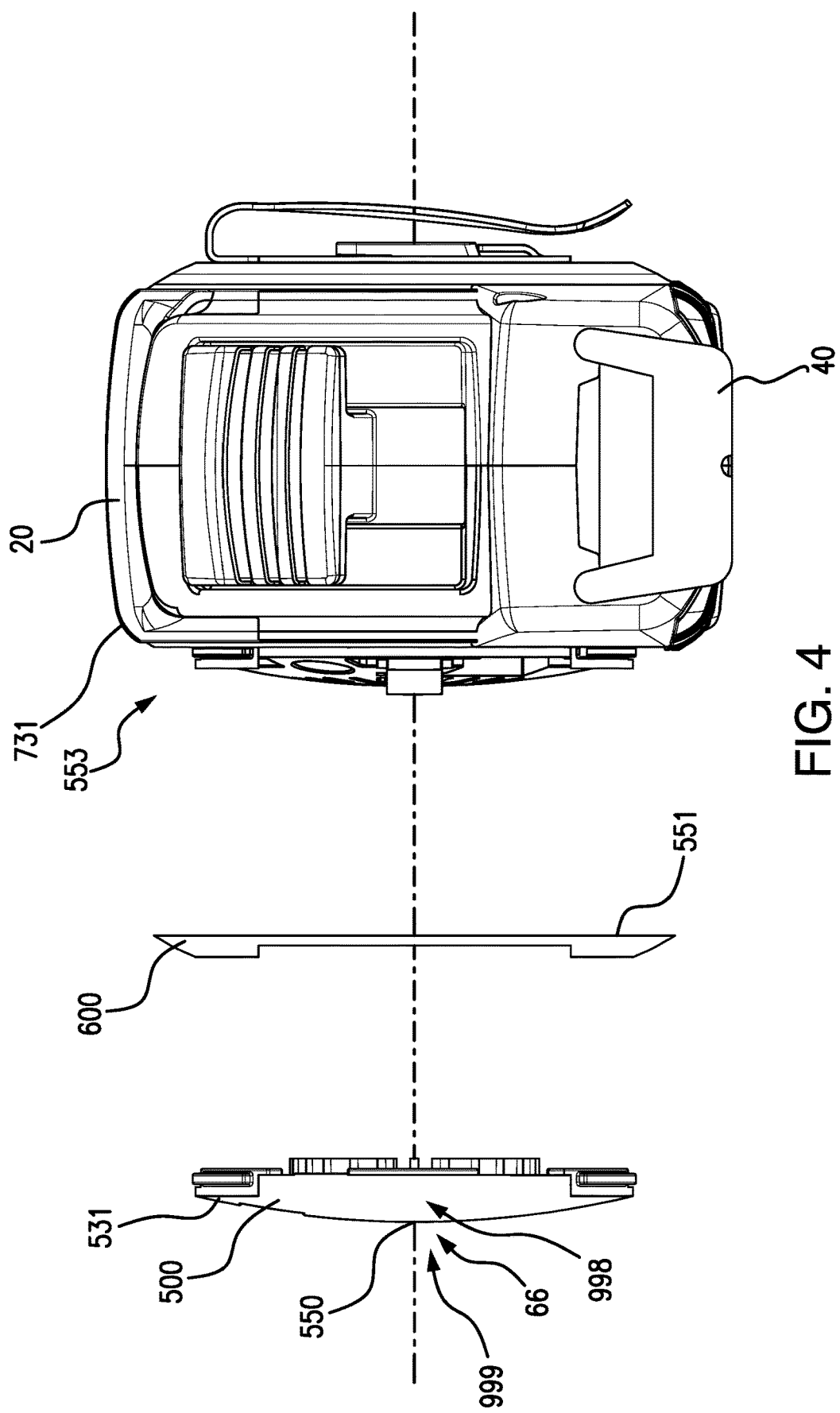
FIG. 4 is a hook side view showing the dome and dome base ring separated from the dome base ring interface of the housing.

FIG. 4 is a hook side view showing the dome 500 having a dome base edge 531 and dome base ring 600 having a base ring edge 551 each separated from the main portion of the housing 20. A transition base edge 731 is also shown. In an embodiment, the grip swell side edge 62 and the transition base edge 731 can be at least in part, or wholly, coplanar.

Numeric values and ranges herein, unless otherwise stated, also are intended to have associated with them a tolerance and to account for variances of design and manufacturing. Thus, a number can include values "about" that number. For example, a value X is also intended to be understood as "about X". Likewise, a range of Y-Z, is also intended to be understood as within a range of from "about Y-about Z". Unless otherwise stated, significant digits disclosed for a number are not intended to make the number an exact limiting value. Variance and tolerance is inherent in mechanical design and the numbers disclosed herein are intended to be construed to allow for such factors (in non-limiting e.g., ±10 percent of a given value). Likewise, the claims are to be broadly construed in their recitations of numbers and ranges.

FIG. 5 is a grip swell side view of the tape measure 10. The values set forth below regarding FIG. 5 are in units of centimeters, or cm^3, unless otherwise stated.

In an embodiment, a tape measure height 450 can have a value in a range of 2.53 cm to 11.40 cm, such as 3.80 cm, 7.60 cm, or 9.50 cm.

In an embodiment, a dome radius 510 can have a value in a range of 1.00 cm to 4.50 cm, such as 1.50 cm, 3.00 cm, or 3.75 cm. FIG. 5 also shows a dome circumference 521.

In an embodiment, a dome diameter 520 can have a value in a range of 2.00 cm to 9.00 cm, such as 3.00 cm, 6.00 cm, or 7.50 cm.

In an embodiment, a dome base ring inner radius 605 (can be same as 510 in an embodiment) can have a value in a range of 1.00 cm to 4.50 cm, such as 1.50 cm, 3.00 cm, or 3.75 cm. FIG. 5 also shows a dome base ring inner circumference 607 and a dome base ring outer circumference 609.

Figure 7:
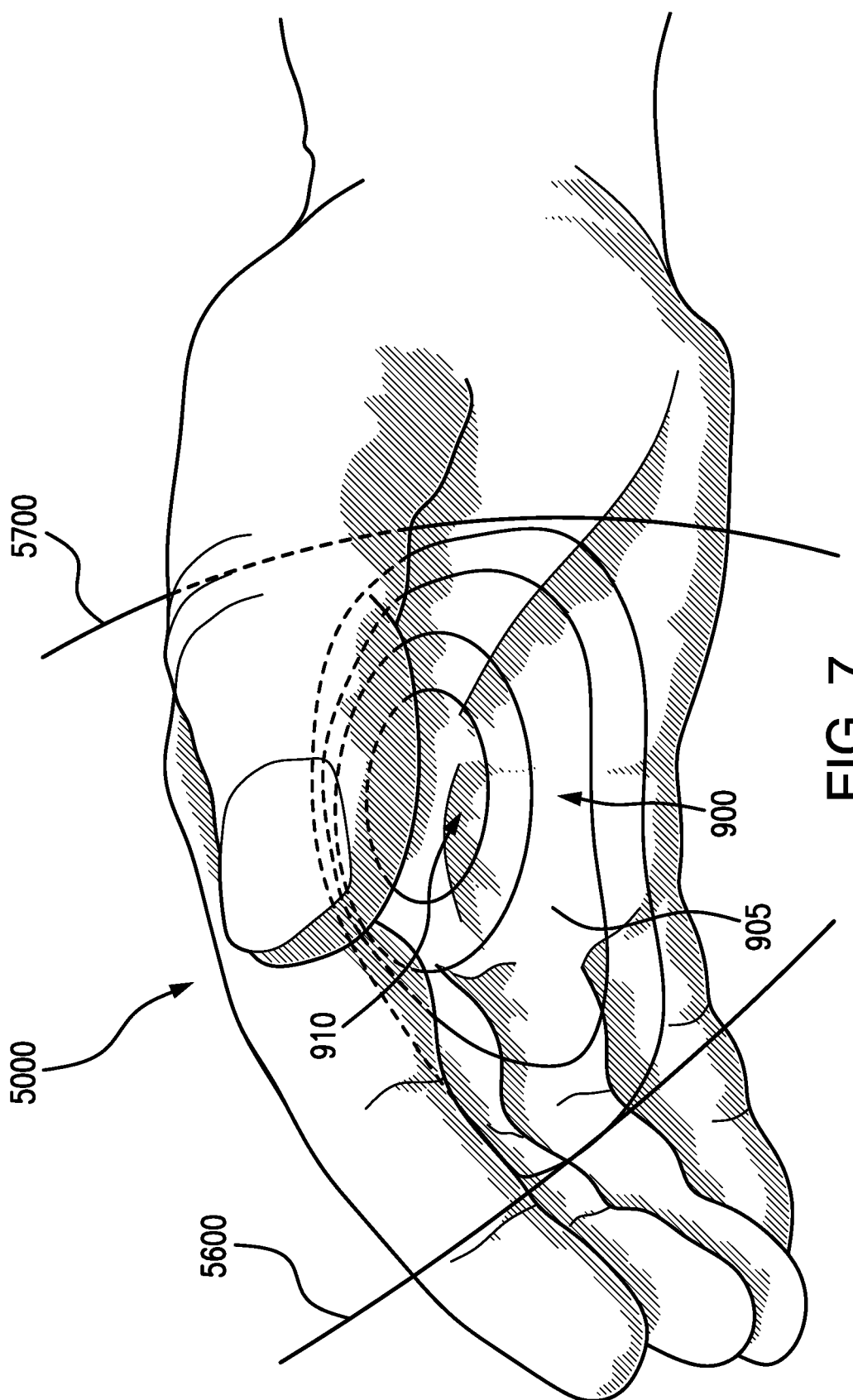
FIG. 7 shows the gripping cavity of an example palm configuration.

In an embodiment, the grip swell side center region 66 can include the grip swell peak 998, or dome peak 550, and be bounded by the dome base ring inner circumference 607. In another embodiment, the grip swell side center region 66 can include the grip swell peak 998, or dome peak 550, and be bounded by the dome base ring outer circumference 609. In yet another embodiment, the grip swell side center region 66 can encompass the grip swell peak 998 and a portion of the grip swell surface 1697 (FIG. 1) such that the grip swell side center region 66 is configured to fill at least a part of an operator's gripping cavity 900 (FIG. 7).

In an embodiment, a dome base ring outer radius 610 can have a value in a range of 1.10 cm to 4.95 cm, such as 1.65 cm, 3.30 cm, or 4.13 cm.

In an embodiment, a dome base ring diameter 620 can have a value in a range of 2.20 cm to 9.90 cm, such as 3.30 cm, 6.60 cm, or 8.25 cm.

Figure 6:
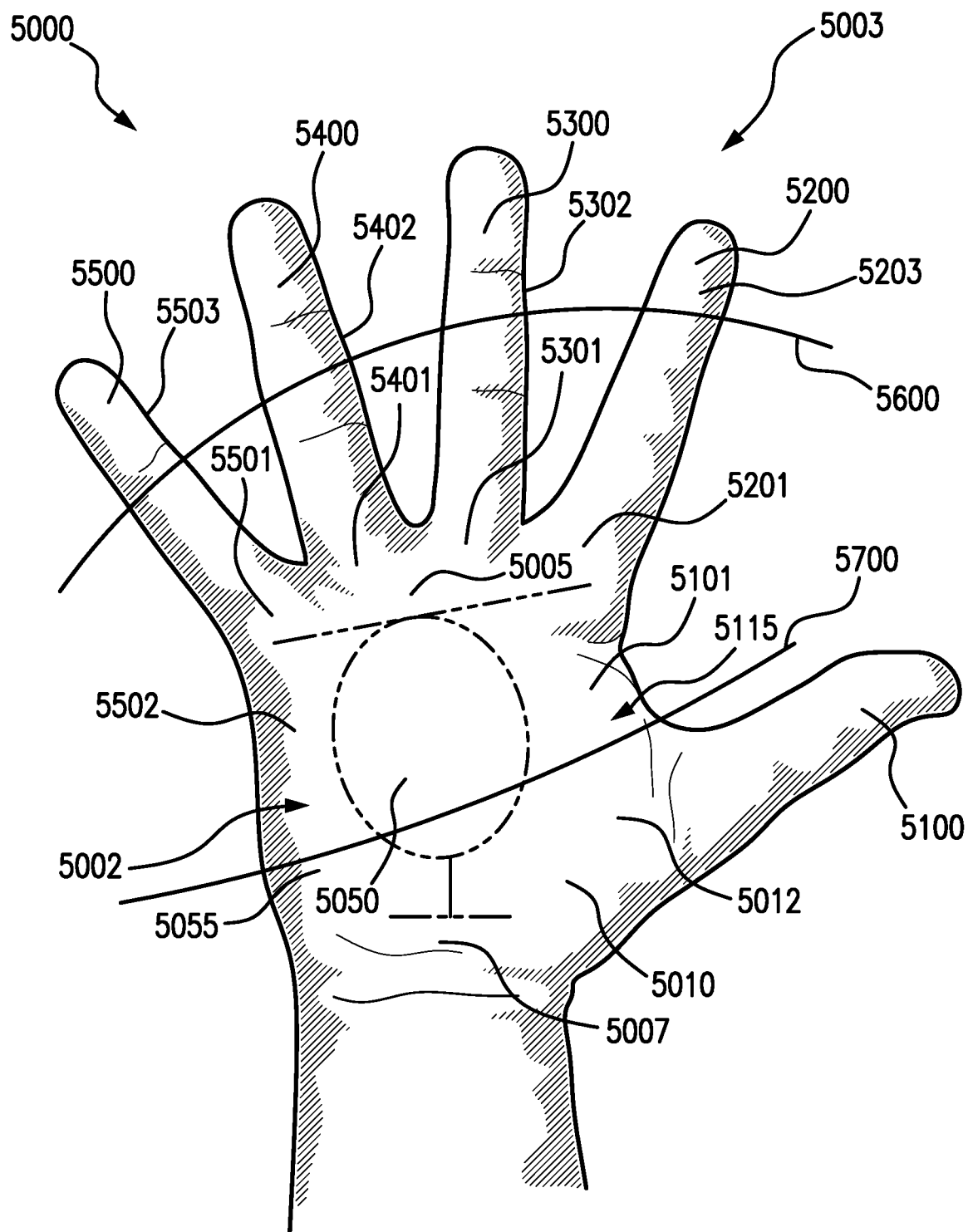
FIG. 6 shows a palm side of a typical human right hand and its various regions.

FIG. 6 shows a palm side of a typical human right hand and its various regions.

FIG. 6 shows the palm side of a typical human right hand. It may be appreciated that the hand may be described using both medical terminology and palmistry (palm reading) terminology so as to understand regions of the hand being specified for reference. FIG. 6 shows hand 5000 having a palm 5002 which has an upper palm 5005, a middle palm (plain of mars) 5050, and a lower palm 5007. The hand 5000 has five fingers 5003, i.e.: the thumb 5100 adjacent to a thenar 5010; a Jupiter finger (pointer finger) 5200 adjacent to a mount Jupiter 5201; a Saturn finger (middle finger) 5300 adjacent to a mount Saturn 5301; an Apollo finger (ring finger) 5400 adjacent to a mount Apollo 5401; a Mercury finger (pinky finger) 5500 adjacent to a mount Mercury 5501 which is adjacent to an upper mars 5502. The palm also has a thenar 5010 adjacent to a thumb 5100 and a mount of Venus 5012. FIG. 6 shows the purlicue 5115 located between the thumb 5100 and the Jupiter finger 5200. A lower mars 5101 is also shown adjacent to the Jupiter finger 5200. The hypothenar 5055 is shown adjacent to the upper mars 5502 and middle palm 5050.

FIG. 6 shows an example of a finger grip curve 5600 which can for example cross the Jupiter finger 5200 proximate to the distal phalange 5203, the Saturn finger 5300 across the middle phalange 5302, the Apollo finger 5400 across the middle phalange 5402 and the Mercury finger 5500 proximate to the distal phalange 5503.

Figure 8:
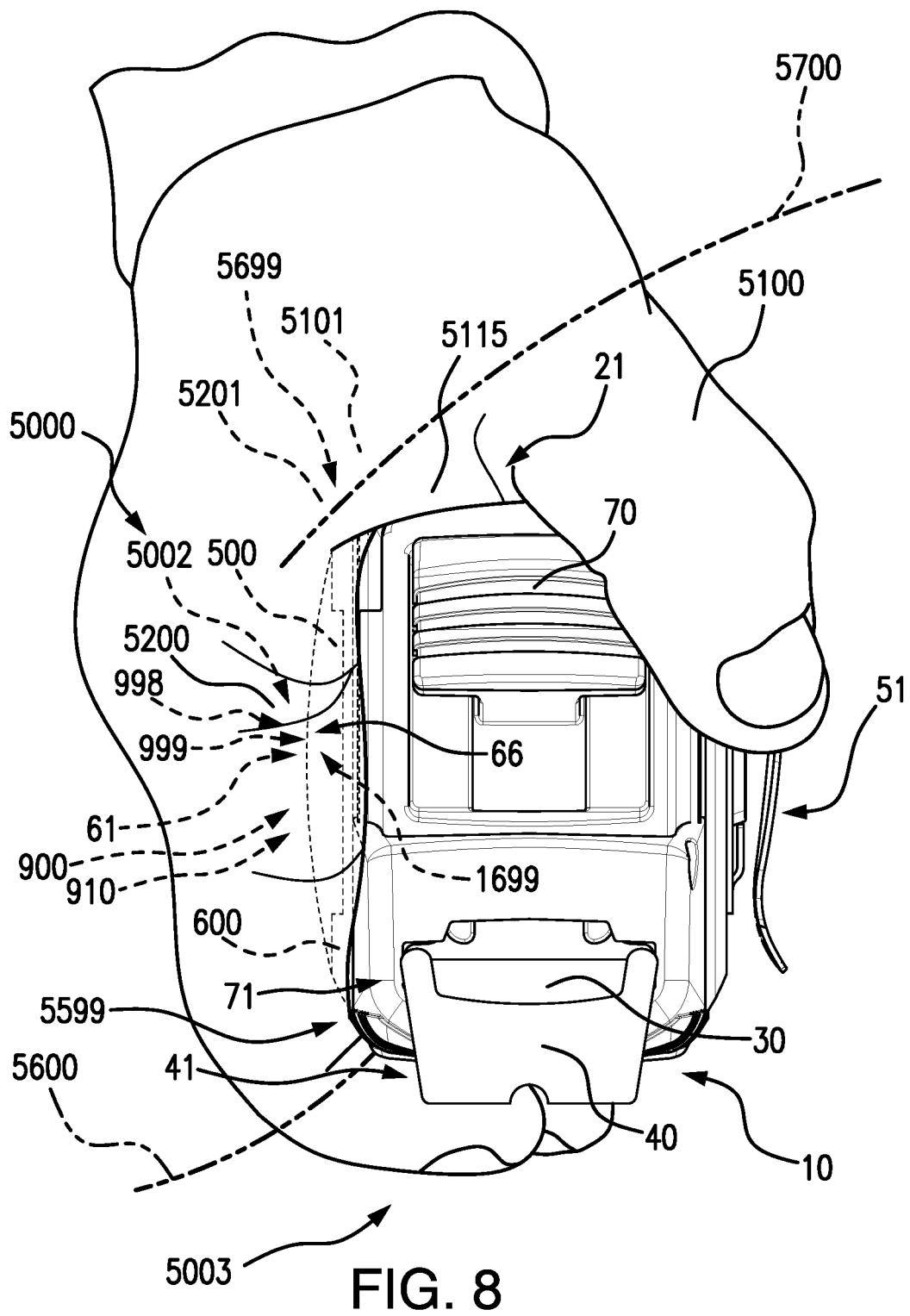
FIG. 8 shows a hand gripping the tape measure with a grip swell volume seated in the gripping cavity.

The position in which the finger grip curve 5600 lies on a given operators hand can be a function of the size and shape of the operator's hand and how the operators hand matches finger position to a finger grip edge 5599 of the tape measure as shown in FIG. 8.

FIG. 6 also shows a palm grip curve 5700 which for example can cross the hypothenar 5055 proximate to the lower palm 5007, a lower portion of the middle palm 5050, an upper portion of the thenar 5010 and the purlicue 5115 between the mount of Venus 5012 and the lower mars 5101.

The position in which the palm grip curve 5700 lies on a given operator's hand can be a function of the size and shape of the operator's hand and how the operator's hand matches the position of the palm to the palm grip edge 5699 of the tape measure as shown in FIG. 8.

FIG. 7 shows the gripping cavity 900 of an example palm configuration. FIG. 7 provides contour lines to show the shape of an example of the gripping cavity 900 of hand 5000. The gripping configuration of hand 5000 in FIG. 7 shows the finger grip curve 5600 and the palm grip curve 5700 configure to respectively grip the finger grip edge 5599 (FIG. 8) and the palm grip edge 5699 (FIG. 8) of the tape measure.

As shown by the contour lines of FIG. 7, the gripping cavity 900 can have a gripping cavity shape 905 which bounds a gripping cavity volume 910. Optionally, the grip swell volume 1699 (FIGS. 1 and 2) can fill all or part of the gripping cavity volume 910. For example, the grip swell volume 1699 can fill 10% to 100% of the gripping cavity volume 910, such as 33%, 50%, and 90%. In an embodiment, the grip swell volume 1699 can fill about 90% to 100% of the gripping cavity.

In an embodiment, the gripping cavity volume 910, can be in a range of 1.41 cm^3 to 128.82 cm^3, such as 4.77 cm^3, 10 cm^3, 19 cm^3, 25^3, 38.17 cm^3, or 74.55 cm^3.

FIG. 8 shows a hand gripping the tape measure with a grip swell volume seated in the middle palm.

FIG. 8 is a finger-side view of an operator gripping the tape measure 10 of FIG. 1. FIG. 8 further shows a hand 5000 of an operator, having a thumb 5100, with purlicue 5115 and palm 5002 gripping the tape measure 10 with the grip swell volume 1699 projecting ergonomically to fill at least in part the gripping cavity 900 with the fingers 5003 gripping the bottom side 41 of the tape measure 10 and the purlicue 5115 and thumb 5100 shown gripping the top side 21 and the thumb 5100 extended adjacent to the slide lock 70.

FIG. 8 also shows the finger grip curve 5600 adjacent to the finger grip edge 5599 and the palm grip curve 5700 adjacent to the palm grip edge 5699 as the hand 5000 grips the tape measure 10.

As shown in FIG. 8, when in the gripped state the grip swell volume 1699 of the tape measure 10 fills at least in part the gripping cavity 900. The dome 500 and the dome ring 600 are shown projecting to fill at least a part of the gripping cavity 900.

FIG. 9 shows a perspective view of the grip swell surface 1697 sectioned by the palm swell plane 1000. In the embodiment of FIG. 9, the grip swell surface 1697 and the grip swell volume 1699 are shown to extend from the grip swell plane 1000 to the dome peak 550.

The geometry of the grip swell surface 1697 can have a grip swell height 699. In the embodiment of FIG. 9, the grip swell 999 has a dome base ring 600 having the dome base ring height 630 and a dome 500 having the dome peak height 530.

Figure 10:
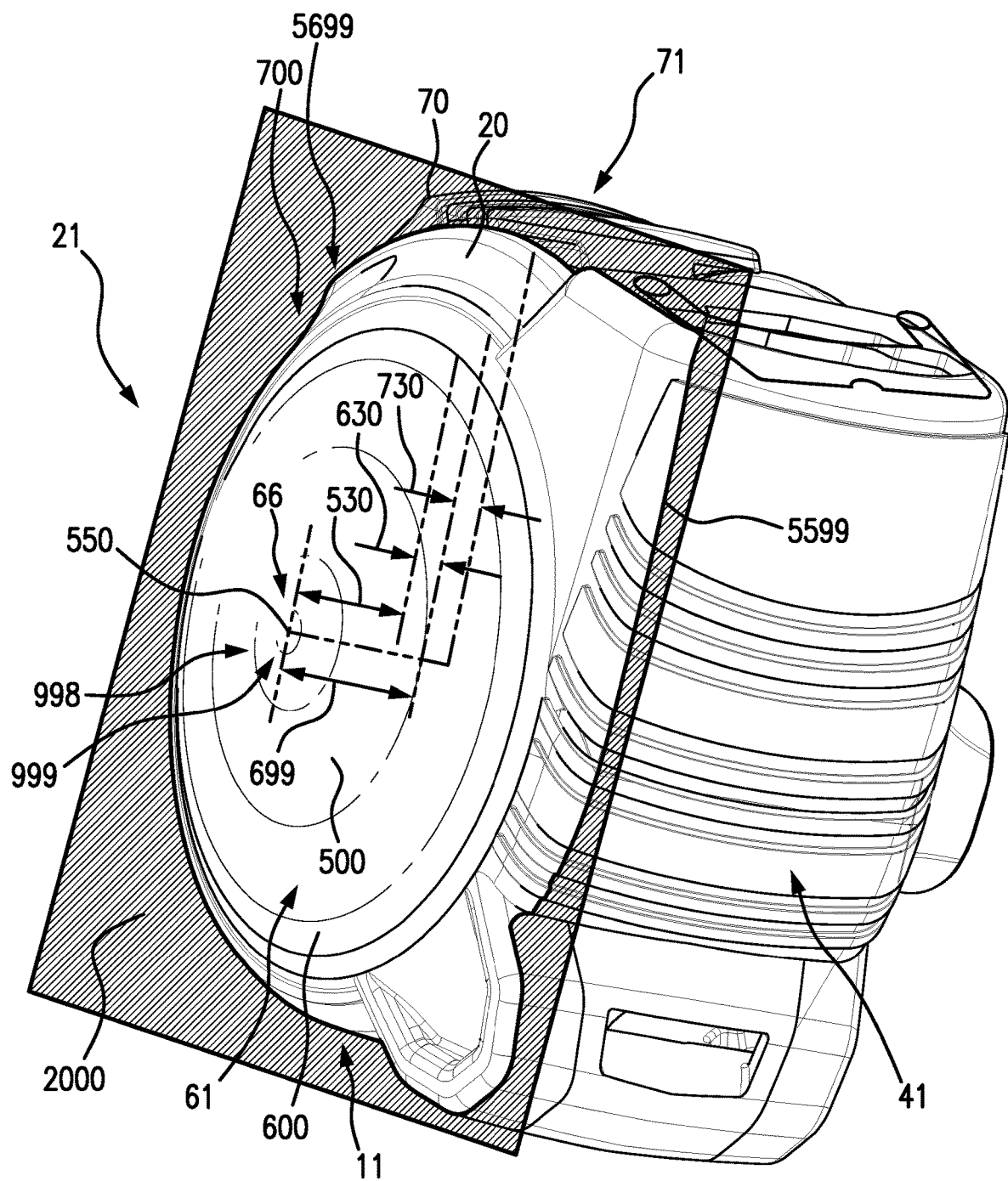
FIG. 10 shows a perspective view of the transition plane.

FIG. 10 shows a perspective view of the transition plane 2000. The transition plane 1000 sections the tape measure 10 at the finger grip edge 5599.

FIG. 10 shows the transition 700, dome base ring 600 and dome 500 configured between the transition plane 2000 and the dome peak 550.

The example embodiment of FIG. 10 has a dome base ring 600 having the dome base ring height 630, a dome 500 having the dome peak height 530, and a transition 700 having the transition height 730. FIG. 10 also show a grip swell height 699.

Figure 11:
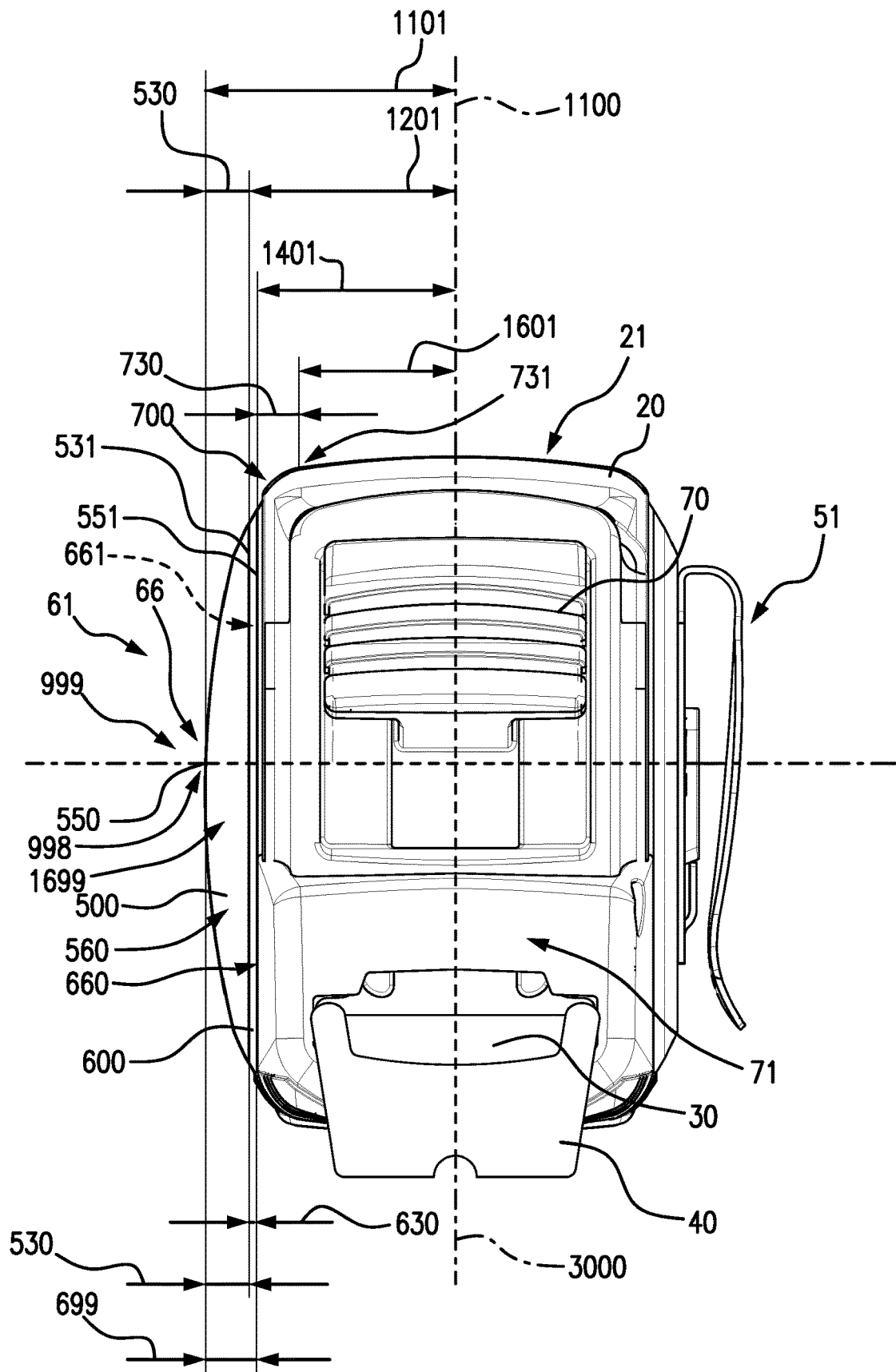
FIG. 11 is a hook side dimensional view of the tape measure.

FIG. 11 is a hook side 71 dimensioned view of the tape measure.

In an embodiment, a dome peak height 530 can have a value in a range of 0.90 cm to 4.05 cm, such as 1.35 cm, 2.70 cm, or 3.38 cm. Peak height 1101 can be the projected distance between the dome peak 550 and the center plane 1100, e.g. in a range of 1 cm to 15 cm, such as 5 cm. In another example, dome base edge distance 1201 can be the projected distance between the dome base edge 531 and the center plane 1100, e.g. in a range of 1 cm to 15 cm, such as 2.6 cm.

In an embodiment, a dome volume 560 can have a value in a range of 1.41 cm^3 to 128.82 cm^3, such as 4.77 cm^3, 10 cm^3, 19 cm^3, 25^3, 38.17 cm^3, or 74.55 cm^3.

In an embodiment, a dome base ring height 630 can have a value in a range of 0.10 cm to 0.45 cm, such as 0.15 cm, 0.30 cm, or 0.38 cm. Ring base height 1401 can be the projected distance between the ring base edge 551 and the center plane 1100, e.g. in a range of 1 cm to 15 cm, such as 2.0 cm.

In an embodiment, a dome base ring annulus section volume 660 can have a value in a range of 0.03 cm^3 to 3.01 cm^3, such as 0.11 cm^3, 0.89 cm^3, or 1.74 cm^3.

In an embodiment, a dome base ring bounded volume 661 can have a value in a range of 0.19 cm^3 to 17.32 cm^3, such as 0.64 cm^3, 5.13 cm^3, or 10.02 cm^3.

In an embodiment, a grip swell height 699, which can equal dome peak height 530+dome base ring height 630, can have a value in a range of 1.00 cm to 4.50 cm, such as 1.50 cm, 3.00 cm, or 3.75 cm.

In an embodiment, the transition height 730 can be in a range of from in a range of 0.70 cm to 3.15 cm, such as 1.05 cm, 2.00 cm, 2.10 cm, or 2.63 cm. Transition base height 1601 can be the projected distance between the transition base edge 731 and the center plane 1100, e.g. in a range of 1 cm to 15 cm, such as 1.7 cm.

In an embodiment, a grip swell volume 1699 can have a value in a range of 1.60 cm^3 to 146.14 cm^3, such as 5.41 cm^3, 43.30 cm^3, or 84.57 cm^3.

Figure 12:
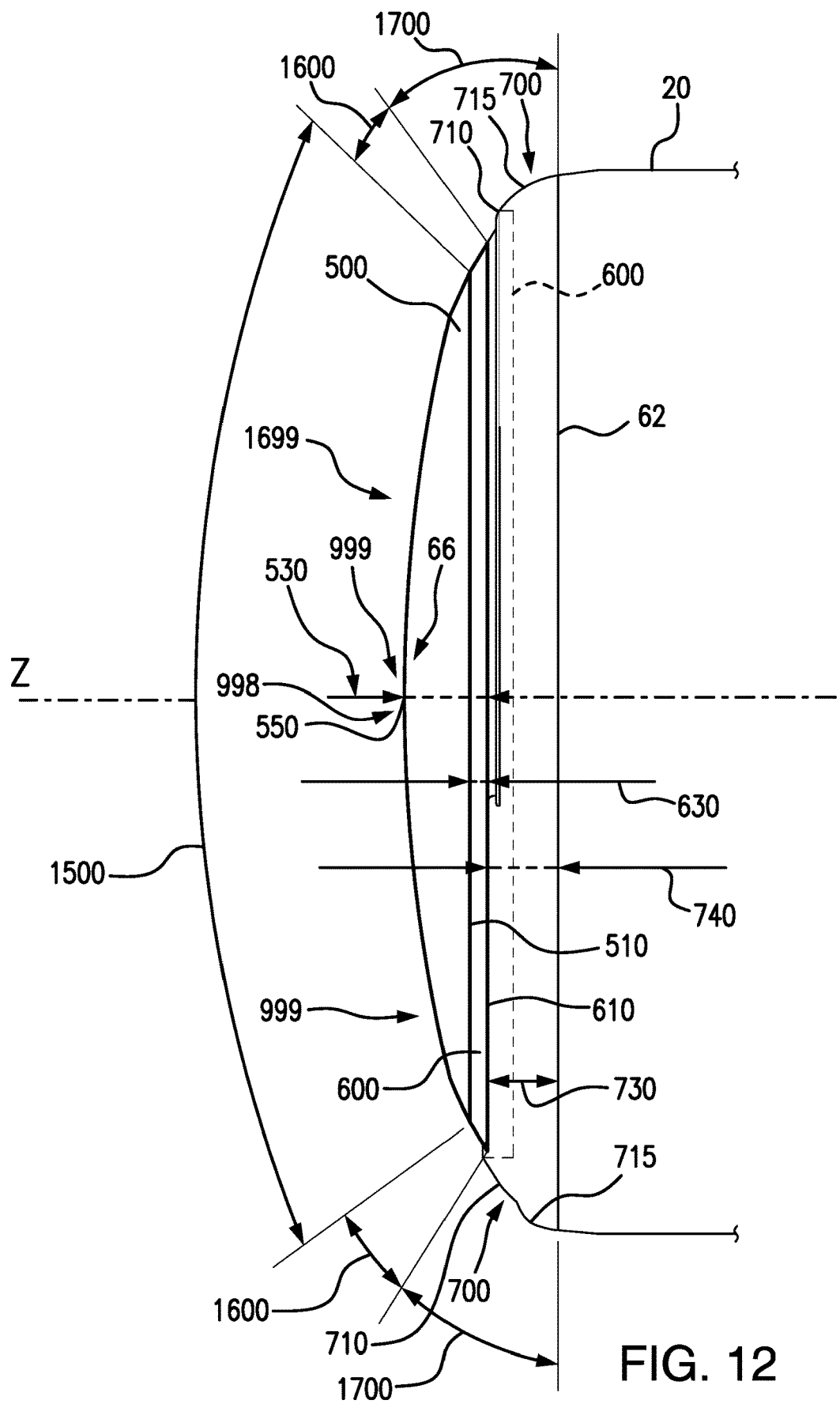
FIG. 12 is a close-up view of the dome, the dome base ring and the transition of the tape measure.

FIG. 12 is a close-up view of the dome 500, the dome base ring 600 and the transition 700 of the tape measure 10.

Figure 18:
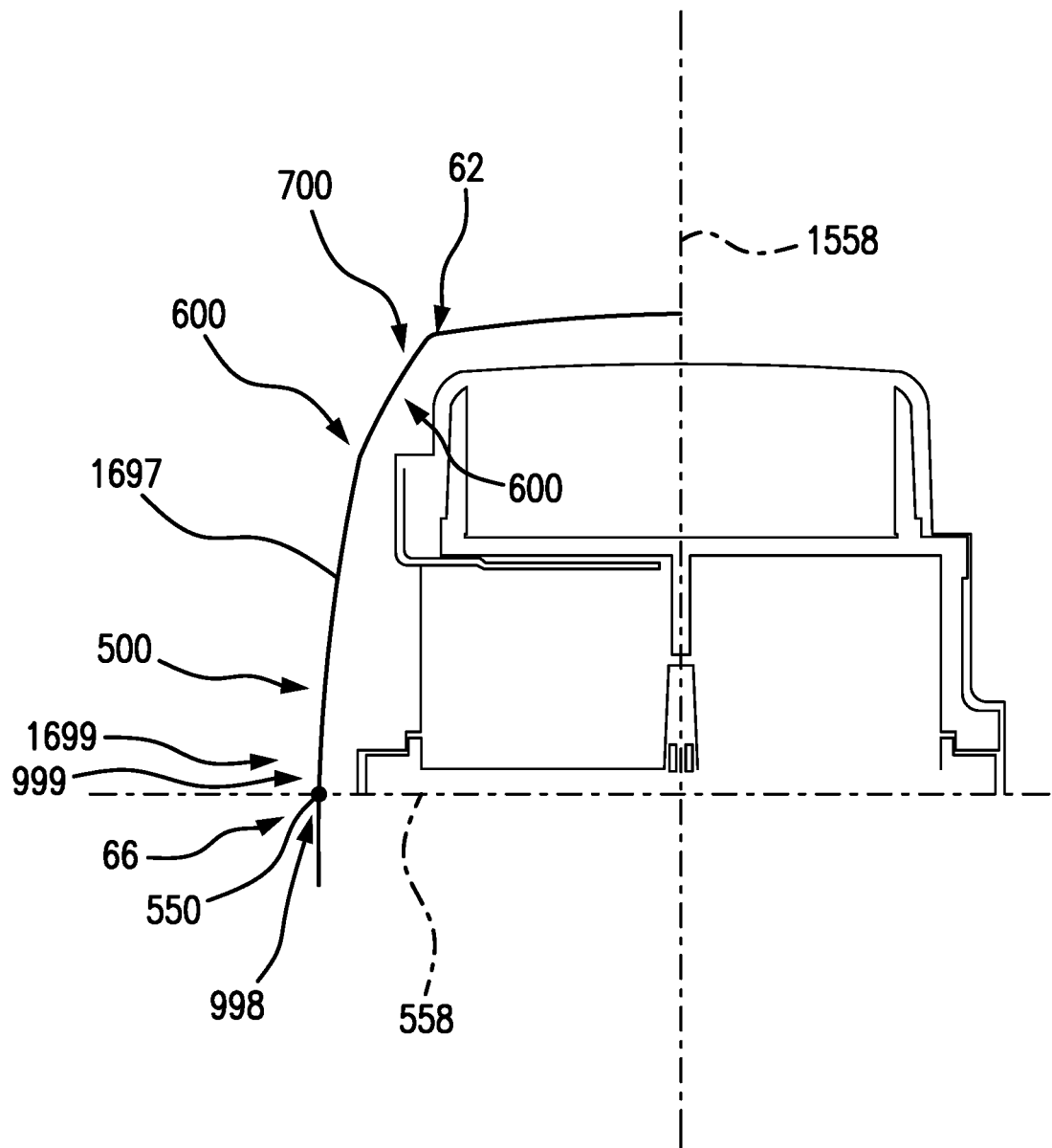
FIG. 18 shows a three faceted grip swell surface.

FIG. 12 shows the grip swell 999 having a dome 500 and dome base ring 600, as well as the transition 700. The embodiment of FIG. 12, the dome 500 is shown to have the dome arc 1500 in a range of 5° to 66°, or 5° to 175°, such as 27°. The dome base ring 600 is shown to have a dome base ring arc 1600 of 0° (straight, or not used) to 33°, or 33° to 75°, such as 13°. The transition 700 is shown to have a transition arc 1700 of 0° (straight, or not used) to 45°, such as 26°. FIG. 18 also shows and example of the grip swell 999 having a dome 500 and dome base ring 600, as well as the transition 700 of the FIG. 12 example embodiment.

Optionally, the transition 700 can have a transition arc 1700 which spans a transition surface 715. The transition surface 715 can optionally be a transition curve 710, a spline surface, a faceted surface, or other surface which transitions between the grip swell side edge 62 and the dome base ring outer radius 610.

Figure 13:
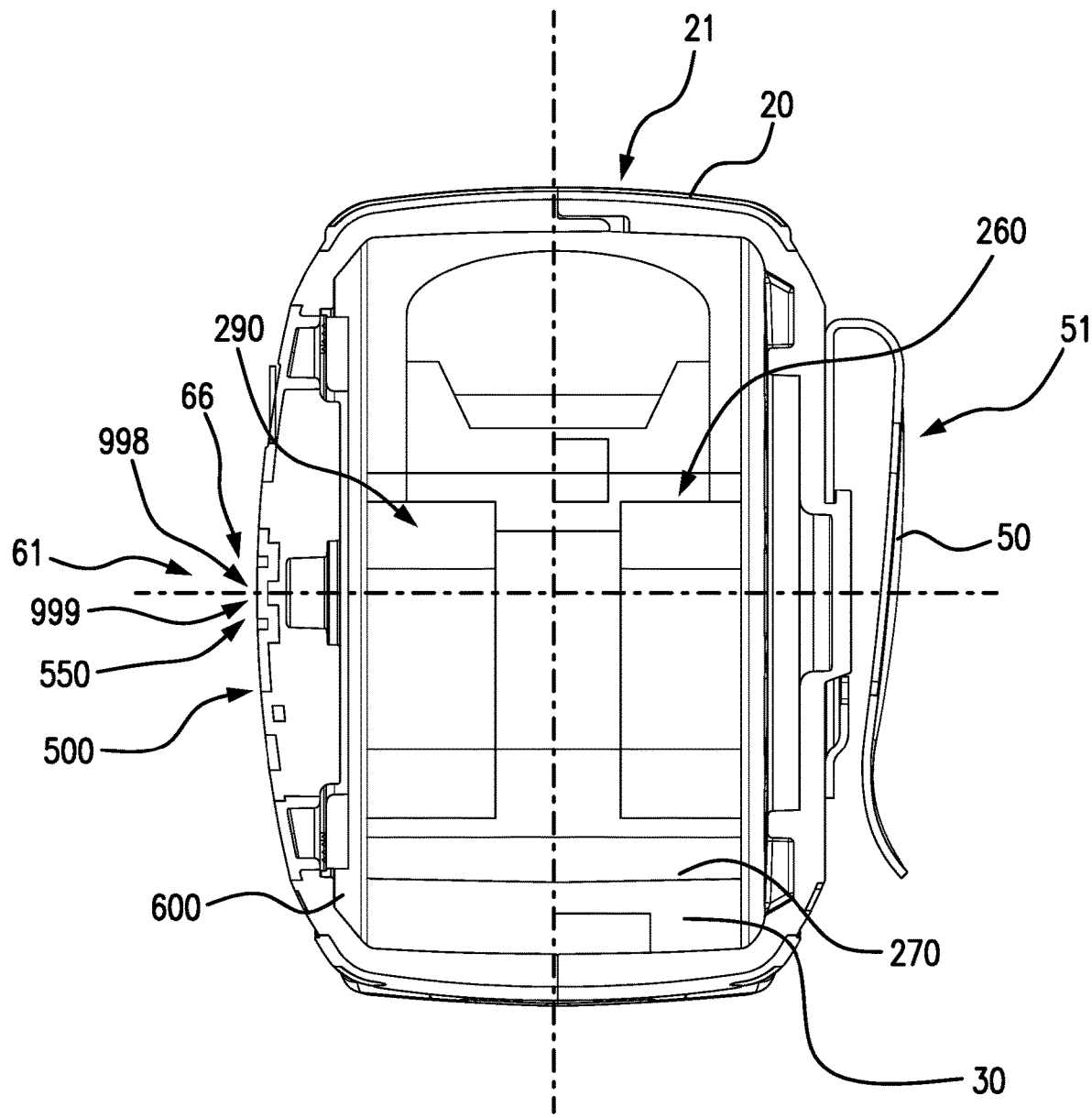
FIG. 13 shows a sectional view of the tape measure and a sectional view of the grip swell.

FIG. 13 shows a sectional view of the tape measure 10 showing a hub 290, motor assembly 260, a motor body 270 and a tape 30 bearing markings for measurement.

Figure 14:
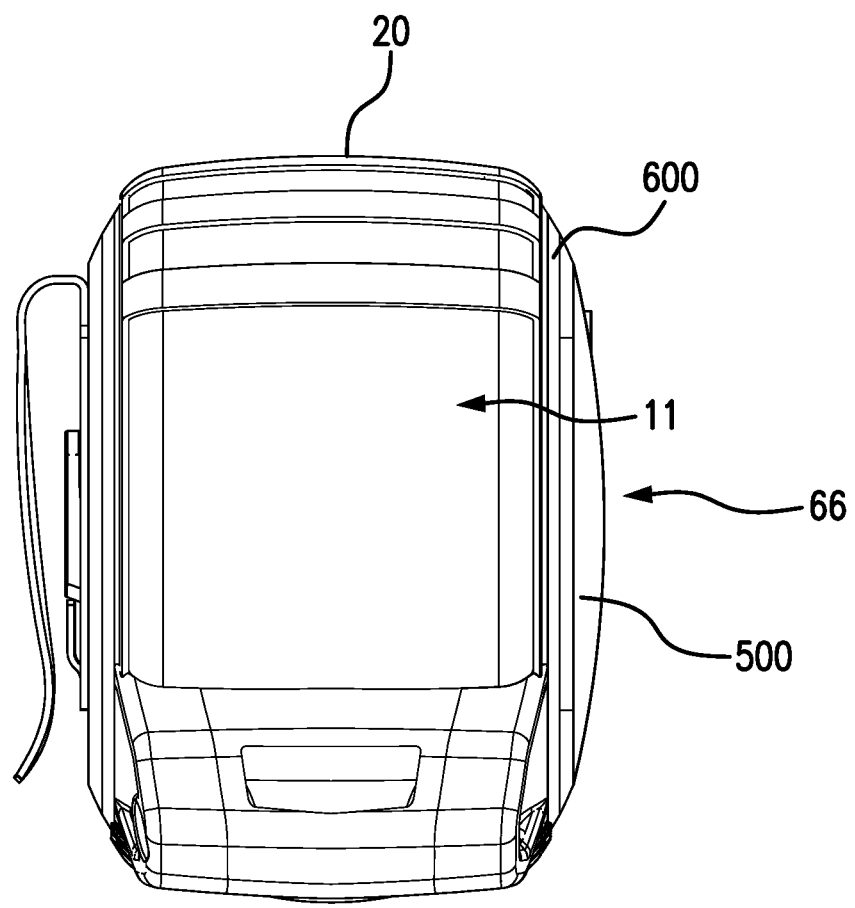
FIG. 14 is a back side view of the tape measure.

FIG. 14 is a back side view of the tape measure.

Figure 15:
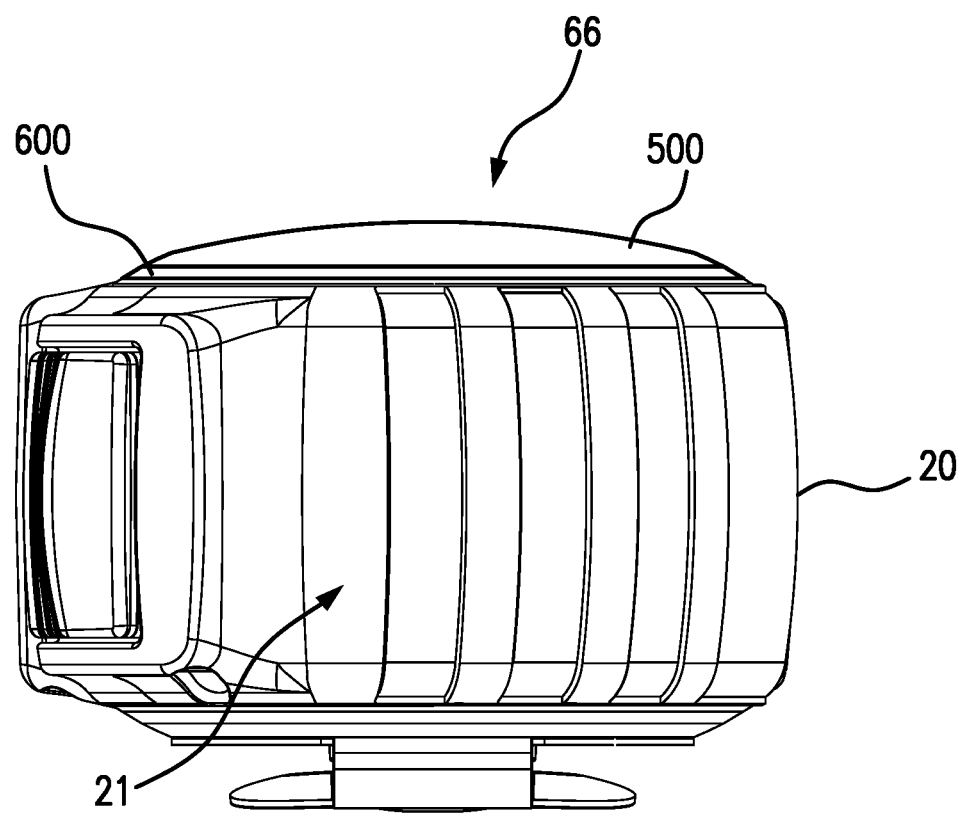
FIG. 15 is a top side view of the tape measure.

FIG. 15 is a top side view of the tape measure.

Figure 16:
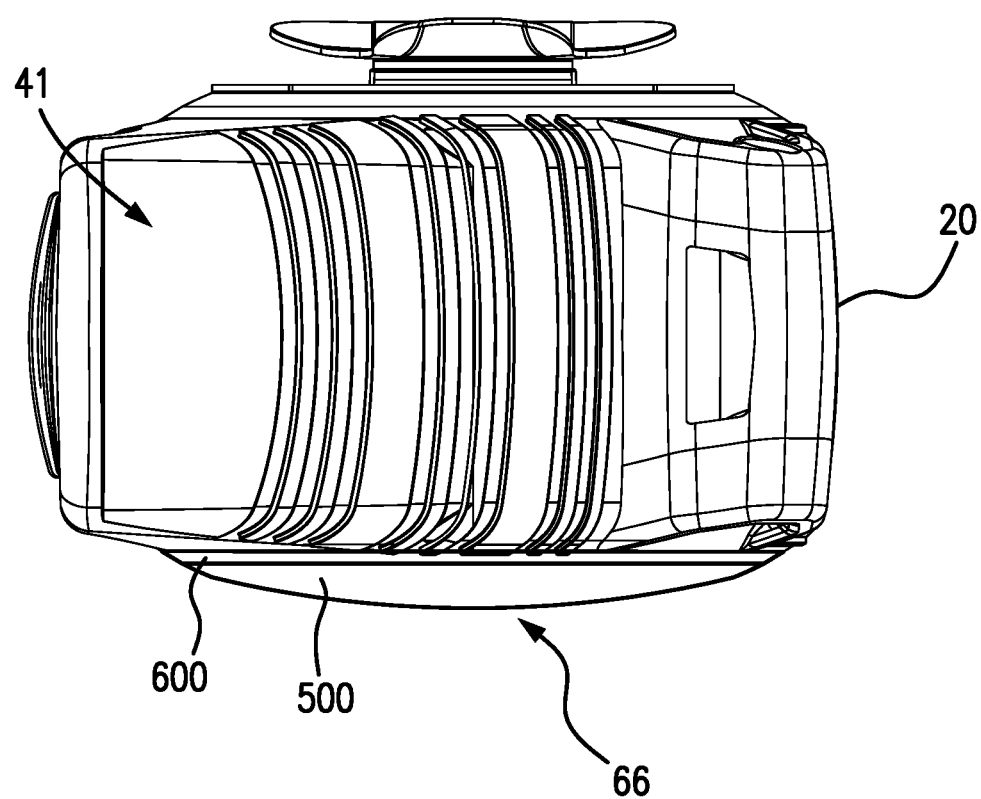
FIG. 16 is a bottom side view of the tape measure.

FIG. 16 is a bottom side view of the tape measure.

Figure 17:
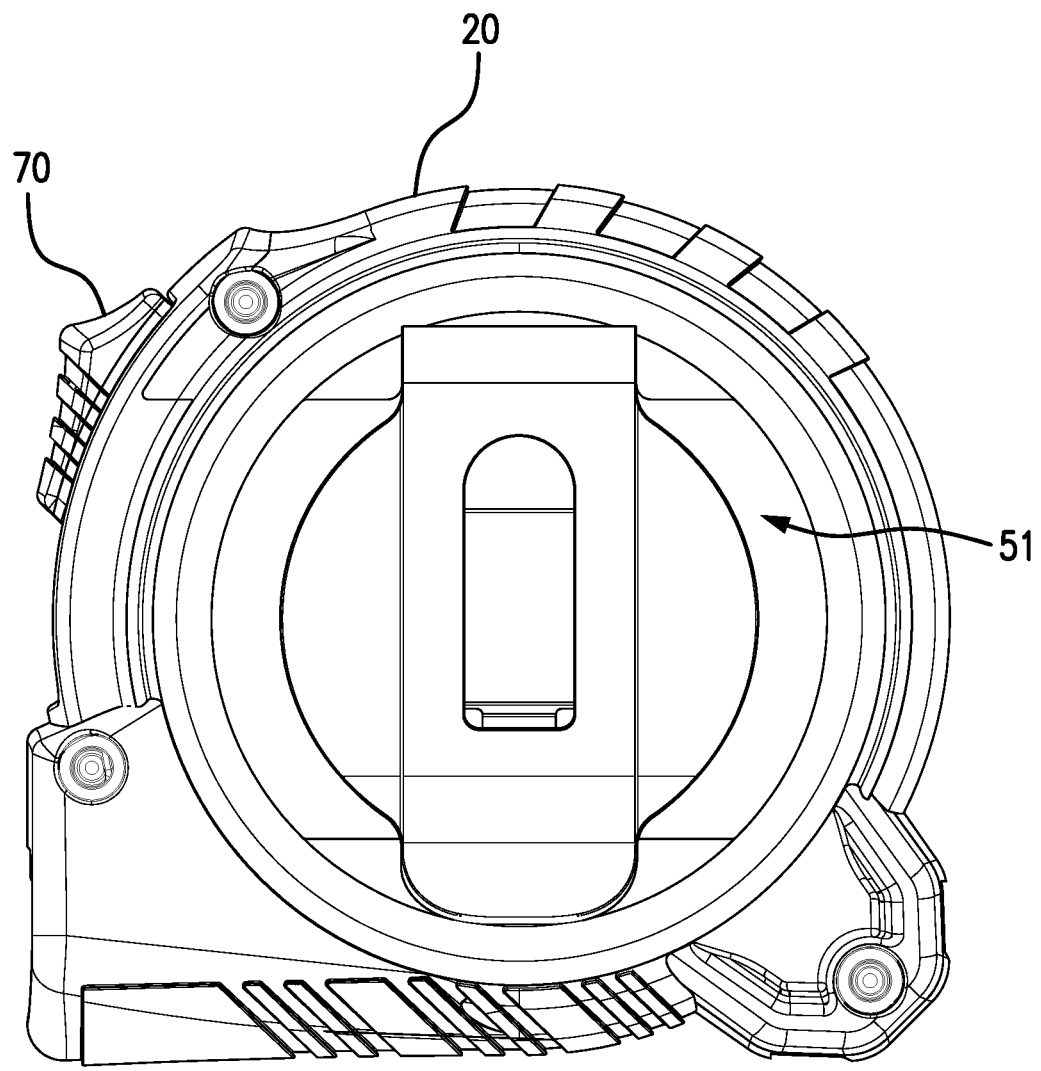
FIG. 17 is a clip side view of the tape measure.

FIG. 17 is a clip side view of the tape measure.

FIG. 18 shows an example of the grip swell 999 having a dome 500 and dome base ring 600, as well as the transition 700 of the FIG. 12 example embodiment. FIG. 18 shows the grip swell surface 1697 having three facets. The first facet corresponds to the dome 500. The second facet corresponds to the dome base ring 600. The third facet corresponds to the transition 700.

In the embodiment of FIG. 18, the curvature of the dome 500, the first facet, can be created by revolving an arc of radius in the range of 3.0 in to 6.0 in, e.g. 4.0 in, 4.5 in or 5.0 in, starting perpendicular to a center 558 at 1.0 in, or greater, away from midplane about center for a distance of 1.0" away from the center 558. The curvature of the dome base ring 600, second facet, can start at the end of the curvature of the dome. The second curvature can terminate at 0.1 in or greater further away from the center 558 than the end of the curvature of the dome and an amount greater than 0.03 in, e.g. 0.5 in closer to a midplane 1558 then the end of the curvature of the dome at a radius of about 1.5 in. In an embodiment, the center 558 can be colinear with the Z axis. In another embodiment, the center 558 can intersect the dome peak 550. In an embodiment, the midplane 1558 can be coplanar with the center plane 1100. The transition 700, third facet, can start at the end of the curvature of the dome ring and can extend to the grip swell side edge 62.

Figure 19A:
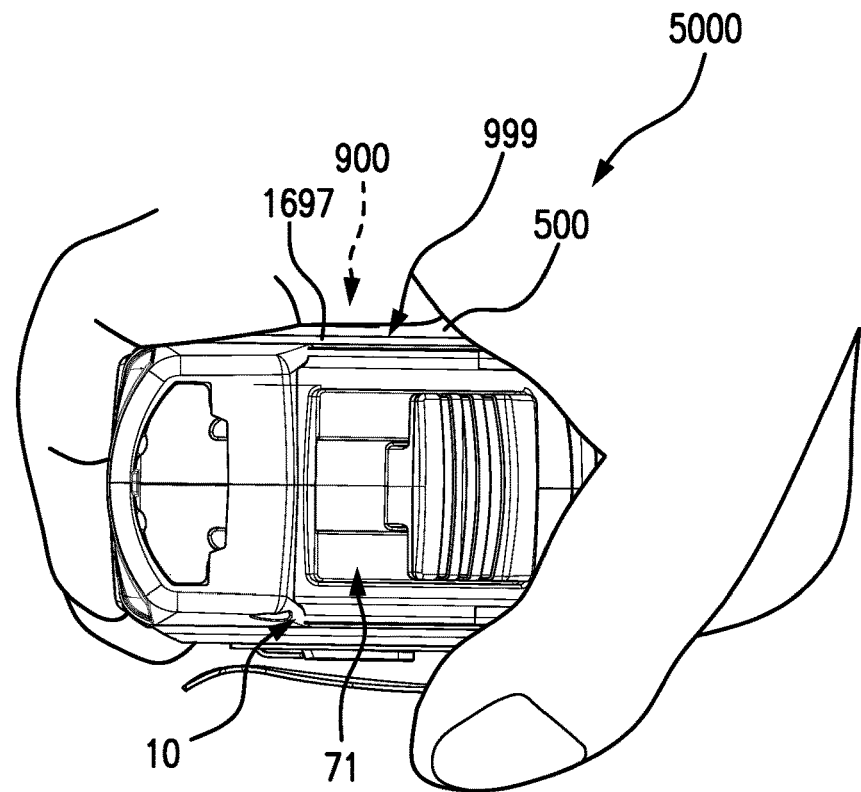
FIG. 19A is a hook side image of an example embodiment of a tape measure having the grip swell gripped by a user.

FIG. 19A is a hook side 71 image of an example embodiment of a tape measure 10 having the grip swell 999 gripped by a user. FIG. 19A shows an example of a hand 5000 of an operator gripping a tape measure 10 having a grip swell 999, which is a dome 500. As can be seen in the example of FIG. 19A, the grip swell 999 has the grip swell surface 1697 which protrudes into gripping cavity 900.

Figure 19B:
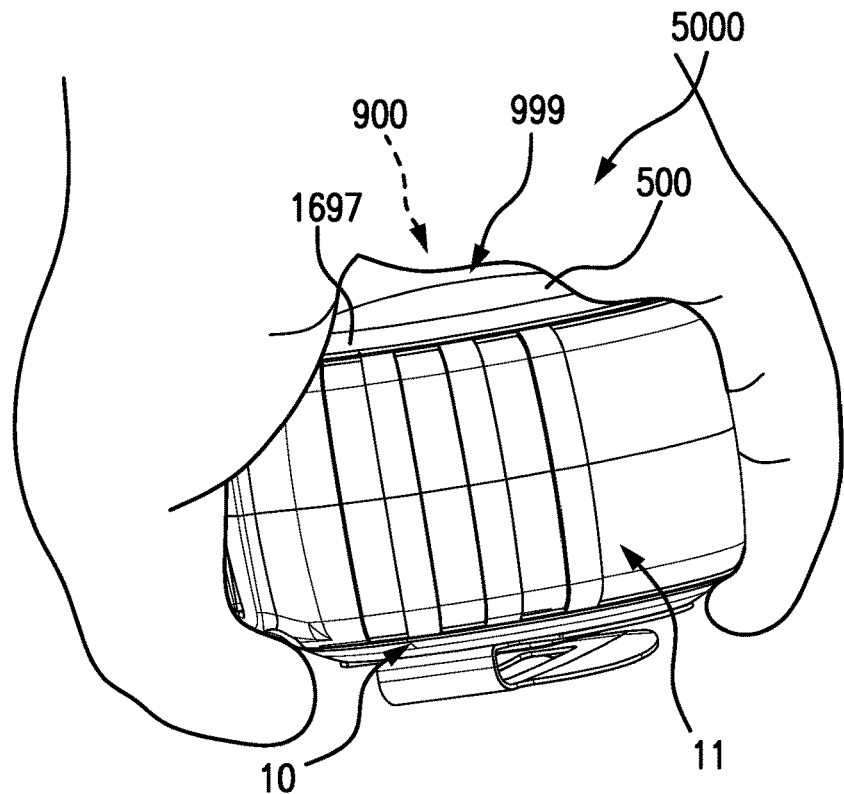
FIG. 19B is a back side image of an example embodiment of a tape measure having the grip swell gripped by a user.

FIG. 19B is a back side 11 image of an example embodiment of a tape measure 10 having the grip swell 999 gripped by a user.

This disclosure regards a hand tool, i.e. a tape measure, and its many aspects, features and elements. Such an apparatus can be dynamic in its use and operation. This disclosure is intended to encompass the equivalents, means, systems and methods of the use of the tape measure and its many aspects consistent with the description and spirit of the apparatus, means, methods, functions and operations disclosed herein. Other embodiments and modifications will be recognized by one of ordinary skill in the art as being enabled by and within the scope of this disclosure.

The scope of this disclosure is to be broadly construed. The embodiments herein can be used together, separately, mixed or combined. It is intended that this disclosure disclose equivalents, means, systems and methods to achieve the devices, designs, operations, control systems, controls, activities, mechanical actions, dynamics and results disclosed herein. For each mechanical element or mechanism disclosed, it is intended that this disclosure also encompasses within the scope of its disclosure and teaches equivalents, means, systems and methods for practicing the many aspects, mechanisms and devices disclosed herein. The claims of this application are likewise to be broadly construed.

The description of the technology herein in its many and varied embodiments is merely exemplary in nature and, thus, variations that do not depart from the gist of the disclosure are intended to be within the scope of the claims and the disclosure herein. Such variations are not to be regarded as a departure from the spirit and scope of the disclosed technologies.

It will be appreciated that various modifications and changes can be made to the above described embodiments of the hand tool i.e. the tape measure, as disclosed herein without departing from the spirit and the scope of the claims.

We claim:

1. A tape measure, comprising:
    a housing at least in part covering a tape selectively extendable from and retractable to a hook side of the housing;
    said housing having a grip swell side which has a grip swell surface; and
    said grip swell surface having a grip swell peak which is part of a curved surface which is convex and which projects at least in part to fill at least a portion of a gripping cavity of an operator; and
    wherein the curved surface has a grip swell height in a range of from 1 cm to 4.50 cm.

2. The tape measure according to claim 1, wherein the grip swell surface has at least in part a convex surface.

3. The tape measure according to claim 1, wherein the grip swell surface has at least in part a surface of revolution.

4. The tape measure according to claim 1, wherein the grip swell surface generally has the shape of a dome.

5. The tape measure according to claim 1, wherein the grip swell surface has a plurality of facets.

6. The tape measure according to claim 1, wherein the grip swell surface is configured at least in part as a surface of revolution of a curve.

7. The tape measure according to claim 1, wherein the grip swell surface is configured at least in part as a surface of revolution of a spline.

8. A tape measure, comprising:
    a housing at least in part covering a tape selectively extendable from and retractable to a hook side of the housing;
    said housing having a grip swell side which has a grip swell volume configured to fill at least a portion of a gripping cavity of a hand of an operator; and
    said grip swell volume having at least a portion of which encompasses at least a portion of a grip swell side center region which has curved surface which is convex and which has at least a portion which projects in a range of from 1 cm to 4.50 cm from a grip swell plane at least in part to fill at least a portion of the gripping cavity.

9. The tape measure according to claim 8, wherein at least a portion of the grip swell volume is configured proximate to a grip swell peak.

10. The tape measure according to claim 8, wherein at least a portion of the grip swell volume is configured proximate to a grip swell peak.

11. The tape measure according to claim 8, wherein the grip swell volume has a grip swell peak which is configured at a distance of 0.3 cm or greater from a grip swell plane.

12. The tape measure according to claim 8, wherein the grip swell volume has a grip swell peak which is configured at a distance of 0.7 cm or greater from a transition plane.

13. The tape measure according to claim 8, wherein the grip swell volume is in a range of 1.60 cm^3 to 146.14 cm^3.

14. The tape measure according to claim 8, wherein the dome volume is in a range of 1.60 cm^3 to 146.14 cm^3.

15. A tape measure, comprising:
a housing having a top side and a bottom side, said housing at least in part covering a tape selectively extendable from and retractable to a hook side of the housing;
said tape measure having a grip swell with a grip swell side center region having a dome peak, a first dome shape radius extending from said dome peak to a portion of said top side and a second dome shape radius extending from said dome peak to a portion of said bottom side;
said grip swell side center region having at least a portion which protrudes from a grip swell plane and projects at least in part to fill at least a portion of the gripping cavity of an operator.

16. The tape measure according to claim 15, wherein said at least a portion which protrudes from a grip swell plane has a portion which is convex.

17. The tape measure according to claim 15, wherein said at least a portion which protrudes from a grip swell plane has a portion which is a dome surface.

18. The tape measure according to claim 15, wherein said at least a portion which protrudes from a grip swell plane has a grip swell peak.

19. The tape measure according to claim 15, wherein said at least a portion which protrudes from a grip swell plane has a dome peak.

20. The tape measure according to claim 15, wherein said at least a portion which protrudes from a grip swell plane is configured to fill at least in part the gripping cavity of an operator.

* * * * *